Dec. 24, 1935.  G. HOUPLAIN  2,025,454
CHECK VALVE FOR AIR BRAKES
Filed Feb. 21, 1934
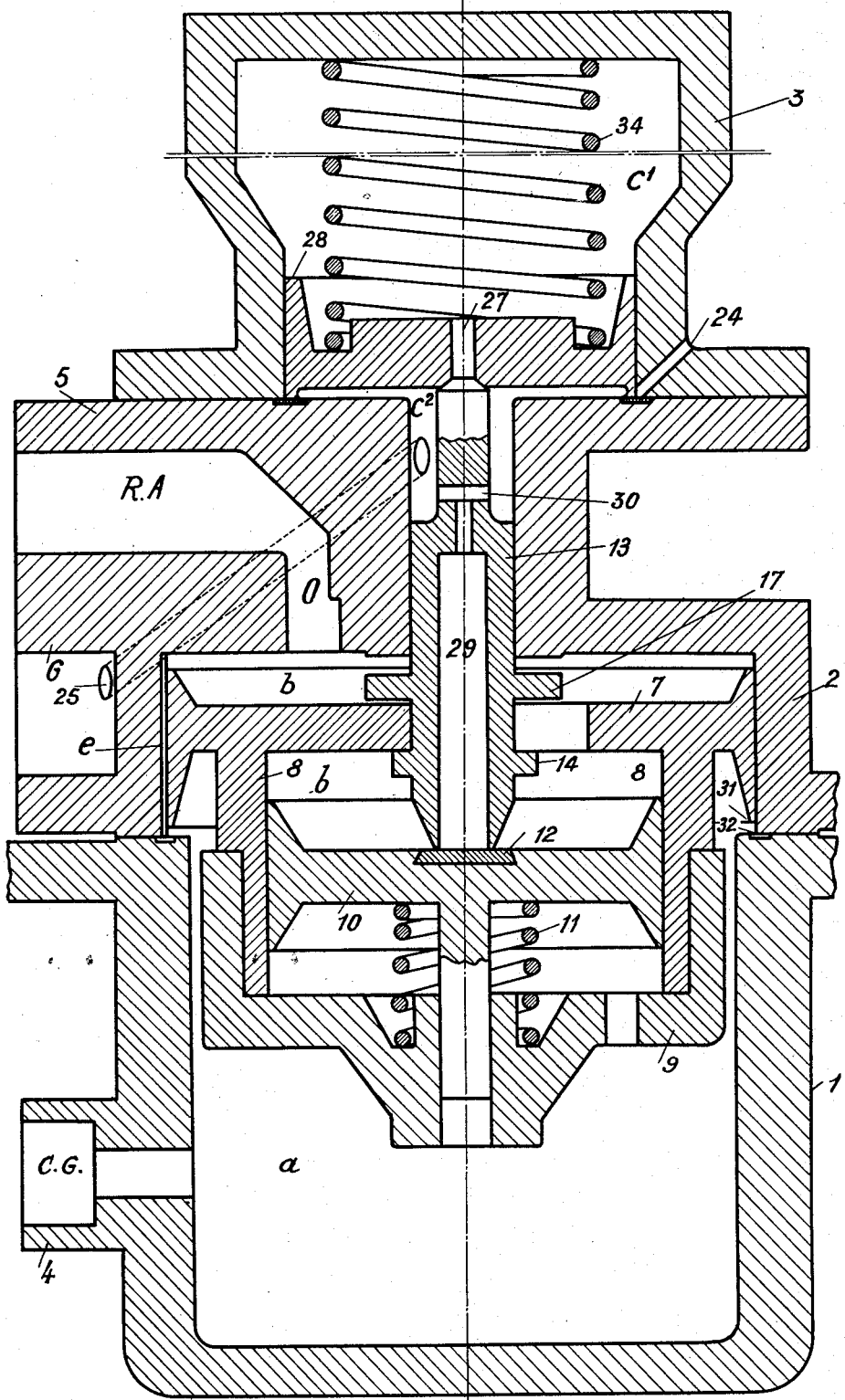
Inventor:
Georges Houplain
per Fred F. Barlow
Attorney.

Patented Dec. 24, 1935

2,025,454

UNITED STATES PATENT OFFICE 2,025,454

CHECK VALVE FOR AIR BRAKES

Georges Houplain, Paris, France

Application February 21, 1934, Serial No. 712,356
In France February 18, 1933

6 Claims. (Cl. 303—33)

This invention relates to a check valve to be used in connection with brakes working under the action of compressed air.

The apparatus constructed according to the invention is made entirely of metal and aims to confer to the brake with which it is associated a wide range of moderating action as well when braking as when unbraking.

An example of the construction of a valve according to the invention is shown in the accompanying drawing:

As shown in this drawing, the apparatus comprises three main parts viz: a first part, having the shape of a bell, set upside down, and designated in the drawing by the numeral 1, and containing the second part, 2, hereinafter called the body, and a third part 3, constituting a cover.

The bell or base 1, comprises a pipe connection 4, leading to the main piping of compressed air; the body 2 comprises two such pipe-connections, the first one, 5, communicating with the auxiliary reserve tank, not shown, and the second, 6, leading to the brake cylinder.

Within the hollow body 2, may reciprocate a piston 7 the under part 8 of which is shaped as a hollow cylinder, externally screw-threaded and onto which is screwed a cover 9.

Within the cylinder 8 can reciprocate a piston 10, normally pushed upwardly by a coil spring 11, against the end 12 of a stem 13 which can slide in body 2.

Near its under part, the stem 13 is provided with two collars 14 and 17, between which is located the plane base of piston 7. Connection is thus established between piston 7 and hollow stem 13, the latter being so as to say the connecting rod of the first.

At the upper part of stem 13 is situated a piston 28, provided with an aperture 27 enabling a communication to be established between two spaces or chambers $C_1$ and $C_2$ respectively situated on the two faces of said piston 28.

The stem 13 contains a channel 29, terminating at the top into a duct 30. This duct permits the air contained in chamber $b$ and coming from the auxiliary tank, to enter the braking cylinder through duct 25.

The apparatus operates as follows:

The air, coming from the main piping penetrates in chamber $a$, passes through the groove $e$ into chamber $b$ and thence, through duct O into the auxiliary tank R—A. When braking is applied, a depression is caused in the main pipe, piston 7 is therefore moved down by superior auxiliary reservoir pressure present in chamber $b$, pulling with it the stem 13 and comes to bear, by its peripheral edge 31 against the seat 32, closing thereby the groove $e$ and communication between chamber $a$ and chamber $b$. As the pressure goes on to decrease, the air from the auxiliary tank acts on the upper face of piston 10, this latter moves therefore down and opens the passage to the air from chamber $b$ into the braking cylinder, through bore 29 and duct 30.

When the pressure in the auxiliary tank R—A has been slightly lowered so as to become equal to the pressure in the main pipe, increased by the action of spring 11, the piston 10 will move up again and close the bore 29.

A repeated depression in the main pipe C. G. will produce the same effect until pressure balance is attained between the auxiliary tank and the cylinder.

It must be noticed that air entering the brake cylinder penetrates also in chamber $C_2$ and further, through channel 27 in chamber $C_1$ so that piston 28 is free to move in the closed upper part of chamber $C_2$.

In case of emergency braking, the pressure in the braking cylinder reaches the value of the pressure prevailing in the auxiliary tank for a single operating action.

From the above it is shown and understood that a very fine graduation of braking action is easily obtainable with the apparatus. As concerns the unbraking, if air is led into the main pipe and in chamber $a$, the pressure will increase in the latter and therefore the piston 7 will move upwards; if the introduction of air is gently regulated, the stem 13 will be swiftly moved up by piston 7. As piston 7 moves up, the stem 13 will come to bear by its upper end against piston 28 and the duct 27 will therefore be closed; a further action will cause the stem 13 to raise piston 28 against the action of spring 34 and soon stop the displacement of stem 13. But at this time, the feeding groove $e$ for the auxiliary tank is slightly open and the auxiliary tank can be fed without unbraking.

If the quantity of air introduced is sufficient and therefore also the pressure, the piston 7 will continue to move and the piston 28 will be raised whilst the air contained in chamber $C_2$ will escape externally through duct 24.

The unbraking graduation is therefore quite easy.

The unbraking can also take place quickly; it is enough to this end to send a sufficient quantity of air through the main piping; the whole system, comprising piston 7 and stem 13 moves up of its whole stroke; the air contained in chamber $C_1$ has time to escape since the air of the main penetrates in the auxiliary tank through groove $e$ and since the capacity of the auxiliary tank is much greater (about 40 times) than that of chamber $C_1$.

If then, the pressure in chamber $a$ increases no more, balance is established between the pressures in chambers $a$ and $b$ and the air acting in chamber $C_1$ on the upper face of piston 28 pushes this piston down and closes the communication from inside of the cylinder to the free by closing duct 24. The air can no more escape from the brake cylinder where the pressure is maintained at its full value.

If now, air is again sent in the pipe, the piston 7 will be moved up and air from chamber $C_1$ will be able to escape again for the piston 28 has been pushed up from its seat.

It has thus been shown that the apparatus forming the object of the present application allows an easy graduation of unbraking.

The check valve described shows the properties required from good working brakes, viz: graduation ability when braking, graduation ability when unbraking, and feeding of the auxiliary tank whilst brakes are on.

I claim:—

1. A check valve for a compressed air brake for controlling the connection between a train pipe, a brake cylinder and an auxiliary reservoir, comprising a piston, a housing for said piston, an axially perforated rod connected to move with said piston, a cylinder element on said piston, a second piston movable in said cylinder element and adapted to close the lower open end of said rod, a spring urging said second piston against said lower end of said rod, means for applying the pressure in the train pipe to the underside and that in the auxiliary reservoir to the upper side of said first piston, which is provided with leakage means to permit charging of the auxiliary reservoir in given positions of said first piston, and a third piston against which the upper end of said rod abuts and controlling an exhaust port, the space below said third piston being in communication with the brake cylinder and with the axial perforation in said rod.

2. In a check valve as claimed in claim 1, means whereby on application of the brake the fall of pressure in the train pipe causes the first piston to move to stop the charging of the auxiliary reservoir and to draw with it the axially perforated rod, the under end of which is obturated by the second piston until the pressure of the auxiliary reservoir is sufficient to force down the second piston to open the axial bore of the said rod and allow the introduction of compressed air to the brake cylinder; and when the pressure in the auxiliary reservoir becomes equal to that prevailing in the main piping added to the action of the spring acting on the second piston, the latter again rises to close the axial bore of the central rod.

3. In a check valve as claimed in claim 1, means whereby the charging of the auxiliary reservoir is possible when the brake is applied wherein the said axially perforated rod obturates a duct formed in the center of the third piston when the pressure in the train pipe rises and tends to lift the third piston, such lifting movement being limited by the strength of a spring acting on said third piston so as to permit charging of the auxiliary tank whilst limiting such lifting so that the brake is not released.

4. In a check valve as claimed in claim 1, means whereby the release of the brake is performed by raising the pressure in the train pipe to promote the raising of the first piston controlling the said rod, the upper end of said rod closing a duct bored in the upper-spring loaded piston and moving the latter to permit release of the pressure in the brake cylinder and exhaust thereof to the free air.

5. A check valve as claimed in claim 1, further comprising a packing against which the first piston seats to close communication between the upper and under sides thereof, said communication being effected by means of a groove, packing on the second piston against which the open end of the perforated rod seats, an enclosing housing for the third piston in which the exhaust port is formed, a bore in said third piston which is engaged by the upper end of said rod, and a spring in said housing tending to force said piston against the upper end of said rod.

6. A check valve as claimed in claim 1, wherein said axially perforated rod is reduced in diameter towards its upper end and wherein lateral ports formed in said reduced portion are in communication with the perforation in the rod and open into a chamber surrounding said rod and limited at the top by the said third piston, said chamber being connected to the brake cylinder by means of a passage.

GEORGES HOUPLAIN.